(12) United States Patent
Lee

(10) Patent No.: US 11,367,972 B2
(45) Date of Patent: Jun. 21, 2022

(54) VEHICLE CONTROLLER HAVING MODIFICATION PREVENTION DEVICE

(71) Applicant: HYUNDAI KEFICO CORPORATION, Gunpo-si (KR)

(72) Inventor: Jun Ho Lee, Seoul (KR)

(73) Assignee: HYUNDAI KEFICO CORPORATION, Gunpo-si (KR)

( * ) Notice: Subject to any disclaimer, the term of this patent is extended or adjusted under 35 U.S.C. 154(b) by 454 days.

(21) Appl. No.: 16/669,934

(22) Filed: Oct. 31, 2019

(65) Prior Publication Data

US 2020/0144746 A1   May 7, 2020

(30) Foreign Application Priority Data

Nov. 2, 2018 (KR) .................. 10-2018-0133431

(51) Int. Cl.

| | |
|---|---|
| *G06F 21/86* | (2013.01) |
| *H01R 12/71* | (2011.01) |
| *B60R 16/023* | (2006.01) |
| *H05K 5/00* | (2006.01) |
| *H01R 13/05* | (2006.01) |
| *G06F 21/82* | (2013.01) |
| *G06F 21/70* | (2013.01) |

(52) U.S. Cl.
CPC .......... *H01R 12/71* (2013.01); *B60R 16/023* (2013.01); *G06F 21/82* (2013.01); *G06F 21/86* (2013.01); *H01R 13/05* (2013.01); *H05K 5/0069* (2013.01); *G06F 21/70* (2013.01)

(58) Field of Classification Search
CPC .......... G06F 21/86; G06F 21/82; G06F 21/83; G06F 21/72; G06F 21/70; G06F 21/85; G06F 2221/2121; G01D 5/24; H05K 1/0275; H05K 5/0208; H05K 5/0069; H05K 7/14; H01H 2239/032; H01L 23/57; H01R 12/71; H01R 13/05; B60R 16/023; B60R 16/02

See application file for complete search history.

(56) References Cited

U.S. PATENT DOCUMENTS

| | | | |
|---|---|---|---|
| 10,251,260 B1 * | 4/2019 | Razaghi | .................. G06F 21/86 |
| 2010/0327856 A1 * | 12/2010 | Lowy | ..................... G06F 21/86 |
| | | | 324/207.16 |
| 2012/0278905 A1 * | 11/2012 | Condorelli | .............. G06F 21/86 |
| | | | 726/34 |

(Continued)

FOREIGN PATENT DOCUMENTS

KR   10-2014-0133259 A1   11/2014

*Primary Examiner* — Steven T Sawyer
(74) *Attorney, Agent, or Firm* — Lempia Summerfield Katz LLC

(57) ABSTRACT

A vehicle controller has a modification prevention device, and the vehicle controller includes: a printed circuit board; a security module frame seated on the printed circuit board and having multiple coupling holes; and security modules inserted into the coupling holes and configured to electrically communicate with a circuit of the printed circuit board. In particular, the security modules include non-conductive insertion pins and conductive insertion pins inserted into the coupling holes, and the non-conductive insertion pins and the conductive insertion pins are scattered while being separated from the coupling holes of the security module when the vehicle controller is disassembled.

8 Claims, 6 Drawing Sheets

(56) References Cited

U.S. PATENT DOCUMENTS

| | | | |
|---|---|---|---|
| 2016/0026828 A1* | 1/2016 | Chen | G06F 21/88 |
| | | | 726/34 |
| 2016/0224807 A1* | 8/2016 | Lee | G06F 3/0219 |
| 2017/0286725 A1* | 10/2017 | Lewis | G06F 1/206 |
| 2018/0054887 A1* | 2/2018 | Sekine | H01L 23/481 |
| 2019/0080121 A1* | 3/2019 | Lewis | G01D 5/24 |

* cited by examiner

VEHICLE CONTROLLER HAVING MODIFICATION PREVENTION DEVICE

CROSS-REFERENCE TO RELATED APPLICATION

This application claims priority to and the benefit of Korean Patent Application No. 10-2018-0133431, filed on Nov. 2, 2018, the entire contents of which are incorporated herein by reference.

FIELD

The present disclosure relates to a vehicle controller having a modification prevention device.

BACKGROUND

The statements in this section merely provide background information related to the present disclosure and may not constitute prior art.

In general, a vehicle is mounted with a vehicle controller such as an electronic control unit (ECU) for electronically controlling various types of devices. The vehicle controller receives information from sensors or switches installed at respective portions in the vehicle. The vehicle controller serves to improve ride quality and safety of the vehicle by processing the received information or to perform several electronic control functions to provide a driver and an occupant with various types of convenience.

For example, an electronic control device for controlling, with a computer, a state of a vehicle engine, an automatic transmission, or an anti-lock brake system (ABS), serves to control all parts in the vehicle such as a driving system, a braking system, and a steering system as well as the automatic transmission along with the development of the vehicles and the computer performances. The vehicle controller such as the electronic control device is structured to include a casing including a cover at an upper side thereof and a base at a lower side thereof, a printed circuit board (PCB) accommodated in the casing, and a connector coupled to a front end of the printed circuit board so as to be connected to an external socket.

However, we have discovered that the vehicle controller in the related art has no separate modification prevention device, such that the vehicle controller has a problem with security because the vehicle controller can be used even though the vehicle controller is disassembled, modified, and then assembled for dishonest purposes.

SUMMARY

The present disclosure provides a vehicle controller having a modification prevention device equipped with security modules to prevent the vehicle controller from being restored to the original state once the vehicle controller is disassembled, thereby inhibiting or preventing the vehicle controller from being modified for dishonest purposes.

An exemplary embodiment of the present disclosure provides a vehicle controller having a modification prevention device, the vehicle controller including: a printed circuit board; a security module frame seated on the printed circuit board and having a plurality of coupling holes; and security modules inserted into coupling holes of the plurality of coupling holes and configured to electrically communicate with a circuit of the printed circuit board. In particular, the security modules include non-conductive insertion pins and conductive insertion pins inserted into the coupling holes, and the non-conductive insertion pins and the conductive insertion pins are scattered while being separated from the coupling holes of the security module when the vehicle controller is disassembled.

The non-conductive insertion pins and the conductive insertion pins may be equal in dimension, shape, and color so that the non-conductive insertion pins and the conductive insertion pins are not distinguishable from each other.

The non-conductive insertion pins and the conductive insertion pins may be inserted into the coupling holes of the security module frame, forming an encrypted pattern when inserted.

The non-conductive insertion pins and the conductive insertion pins each may have a cylindrical shape.

The non-conductive insertion pins and the conductive insertion pins may be inserted into the coupling holes of the security module frame, and then a security module cover may be coupled to press upper portions of the non-conductive insertion pins and upper portions of the conductive insertion pins.

A conductive bottom surface of the security module cover may be in contact with the conductive insertion pins to constitute the circuit of the printed circuit board.

A housing may be coupled to surround the printed circuit board and the security module cover.

One end of the non-conductive insertion pins and one end of the conductive insertion pins each may have an elastic portion so that the non-conductive insertion pins and the conductive insertion pins are smoothly separated when the vehicle controller is disassembled.

According to the present disclosure, the security modules are mounted so as to prevent them from being restored to the original state once the vehicle controller is disassembled, thereby preventing the vehicle controller from being modified for dishonest purposes.

The present disclosure may improve the security of the vehicle controller by using the security modules.

The foregoing summary is illustrative only and is not intended to be in any way limiting. In addition to the illustrative aspects, embodiments, and features described above, further aspects, embodiments, and features will become apparent by reference to the drawings and the following detailed description.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
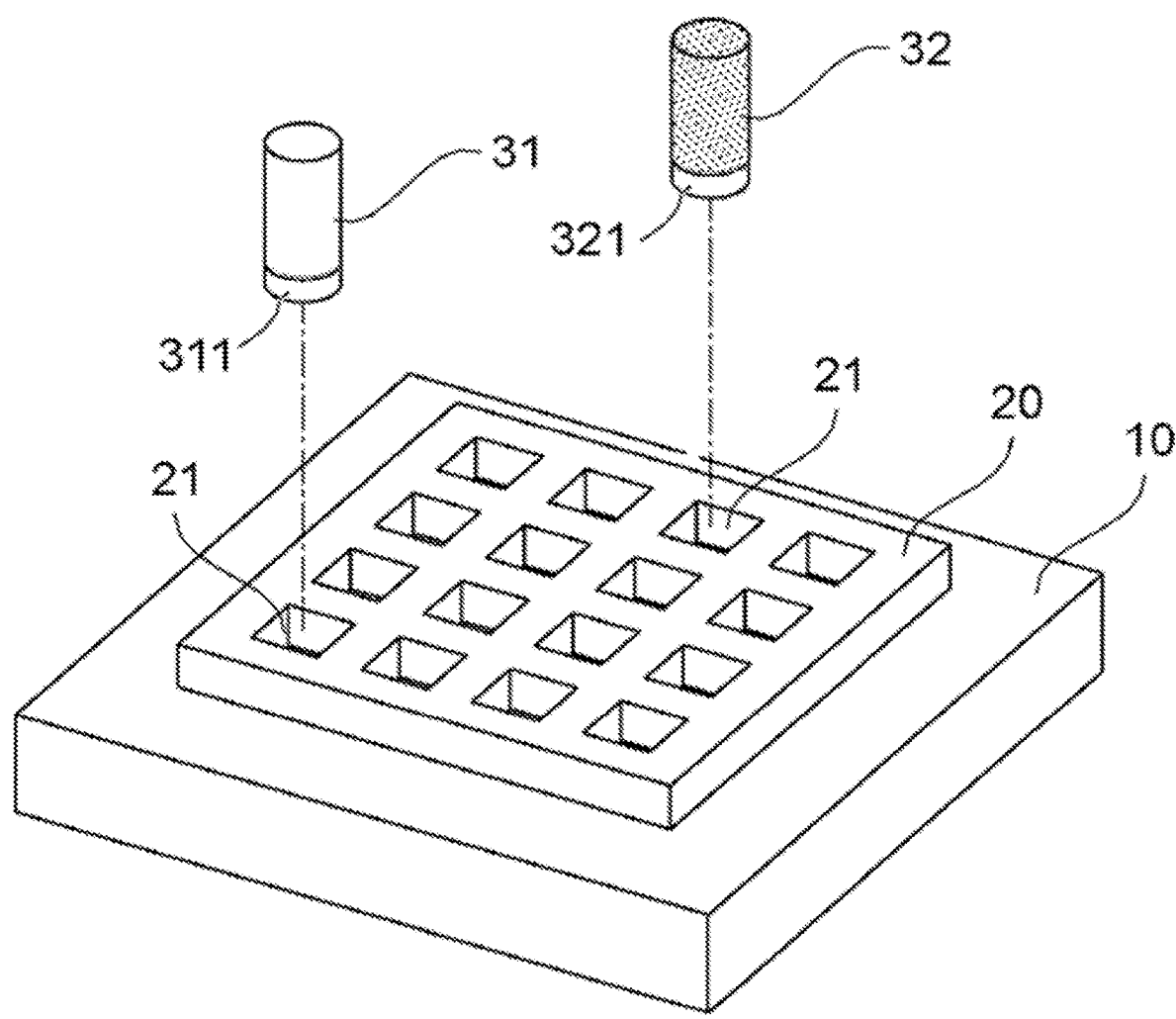
FIG. 1 is a perspective view of a vehicle controller having a modification prevention device.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

Hereinafter, exemplary embodiments of the present disclosure will be described in detail with reference to the accompanying drawings. In addition, in the description of the present disclosure, the specific descriptions of publicly known related configurations or functions will be omitted when it is determined that the specific descriptions may obscure the subject matter of the present disclosure. Further, the exemplary embodiments of the present disclosure will be described below, but the technical spirit of the present disclosure is not limited thereto and may of course be modified and variously carried out by those skilled in the art.

The vehicle controller in the related art has no separate modification prevention device, as a result of which the vehicle controller has a problem with security because the vehicle controller can be used even though the vehicle controller is disassembled, modified, and then assembled for dishonest purposes. In contrast, the present disclosure provides a mechanism that inhibits or prevents the vehicle controller from being restored to the original state once the vehicle controller is disassembled, thereby inhibiting or preventing the vehicle controller from being modified.

Figure 2:
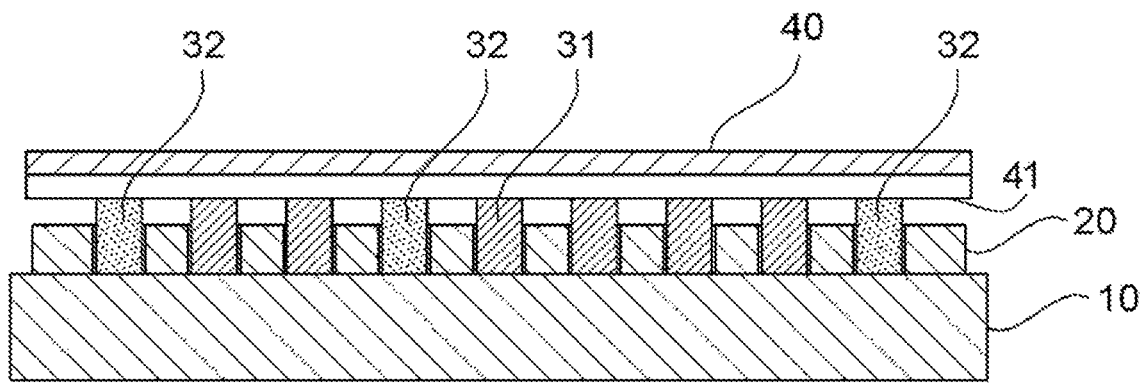
FIG. 2 is a cross-sectional side view of the vehicle controller having the modification prevention device.
Figure 3:
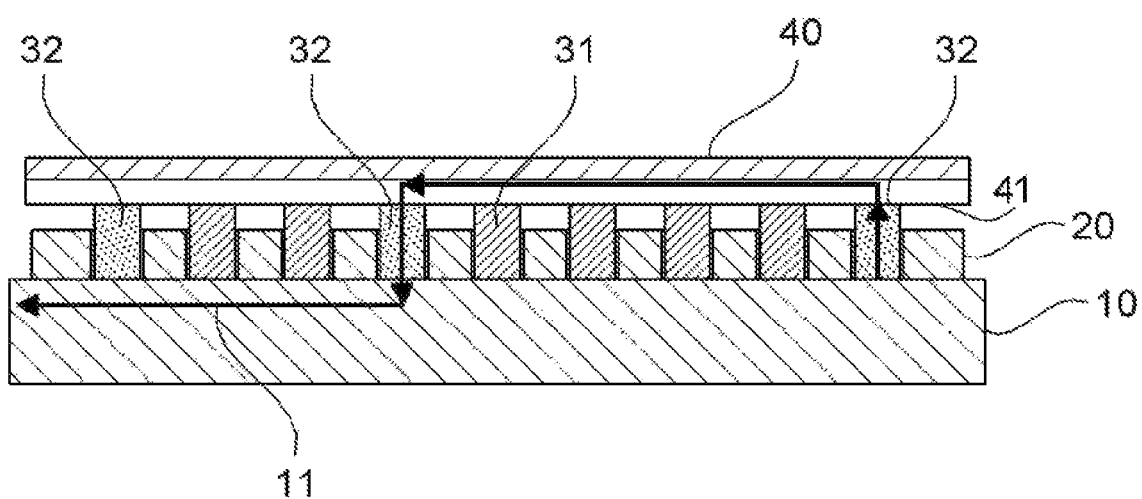
FIG. 3 is a view illustrating a circuit configuration implemented by conductive insertion pins.

FIG. 1 is a perspective view of a vehicle controller having a modification prevention device according to an exemplary embodiment of the present disclosure, FIG. 2 is a cross-sectional side view of the vehicle controller having the modification prevention device according to the exemplary embodiment of the present disclosure, and FIG. 3 is a view illustrating a circuit configuration implemented by conductive insertion pins according to the exemplary embodiment of the present disclosure.

The present disclosure includes a printed circuit board 10, a security module frame 20 seated on the printed circuit board 10, and security modules coupled to the security module frame 20.

The printed circuit board 10 has a circuit 11. The security module frame 20 is seated on and coupled to the printed circuit board 10. The security module frame 20 is configured as a frame in the form of a lattice. Multiple coupling holes 21 are arranged in the security module frame 20. The security module, which is a modification prevention device, is inserted into the coupling hole 21.

The security modules include non-conductive insertion pins 31 and conductive insertion pins 32. The non-conductive insertion pin 31 and the conductive insertion pin 32 are inserted into the coupling holes 21 of the security module frame 20. The non-conductive insertion pin 31 and the conductive insertion pin 32 are inserted into the coupling holes 21 while corresponding to the circuit 11 of the printed circuit board 10. A contact point of the conductive insertion pin 32 is connected to a circuit 11 of the printed circuit board 10 (see FIG. 3) such that the security modules are configured to electrically communicate with the circuit 11 of the printed circuit board 10.

The non-conductive insertion pin 31 and the conductive insertion pin 32 are illustrated as being distinguished from each other in FIGS. 1 to 3. However, the non-conductive insertion pin 31 and the conductive insertion pin 32 are manufactured to be equal in dimension, shape, and color so that external appearances of the non-conductive insertion pin 31 and the conductive insertion pin 32 are not distinguishable.

The non-conductive insertion pin 31 and the conductive insertion pin 32 are inserted into the coupling holes 21 of the security module frame 20 to form an encrypted pattern.

Each of the non-conductive insertion pin 31 and the conductive insertion pin 32 may have a cylindrical shape so as to be separated from the coupling hole 21 of the security module frame 20 when the vehicle controller is disassembled.

As an example, one end of the non-conductive insertion pin 31 and one end of the conductive insertion pin 32 each may have an elastic portion (311, 321) so that the non-conductive insertion pin 31 and the conductive insertion pin 32 are smoothly separated when the vehicle controller is disassembled.

A security module cover 40 is coupled to upper portions of the security module. A housing 50 is coupled to surround the security module cover 40 and the printed circuit board 10.

Next, an assembly process according to one form of the present disclosure will be described.

FIGS. 4 to 7 are views illustrating a process of assembling the vehicle controller having the modification prevention device according to the exemplary embodiment of the present disclosure.

Figure 4:
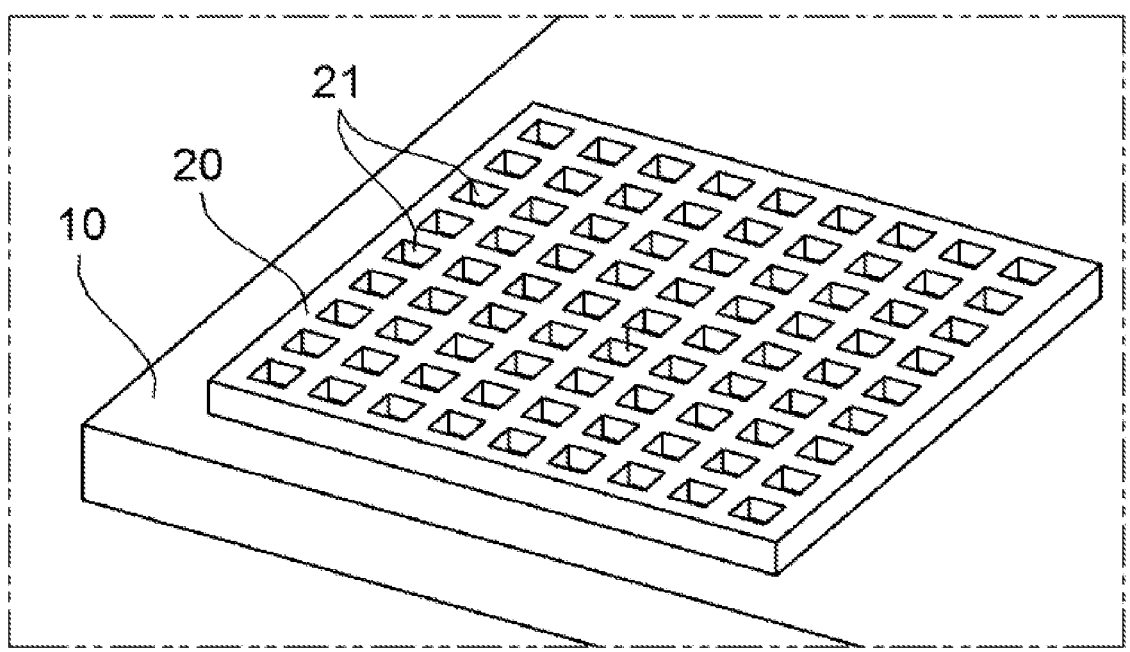
FIGS. 4 to 7 are views illustrating a process of assembling the vehicle controller having the modification prevention device.

As illustrated in FIG. 4, the security module frame 20 is seated on and coupled to the printed circuit board 10.

Figure 5:
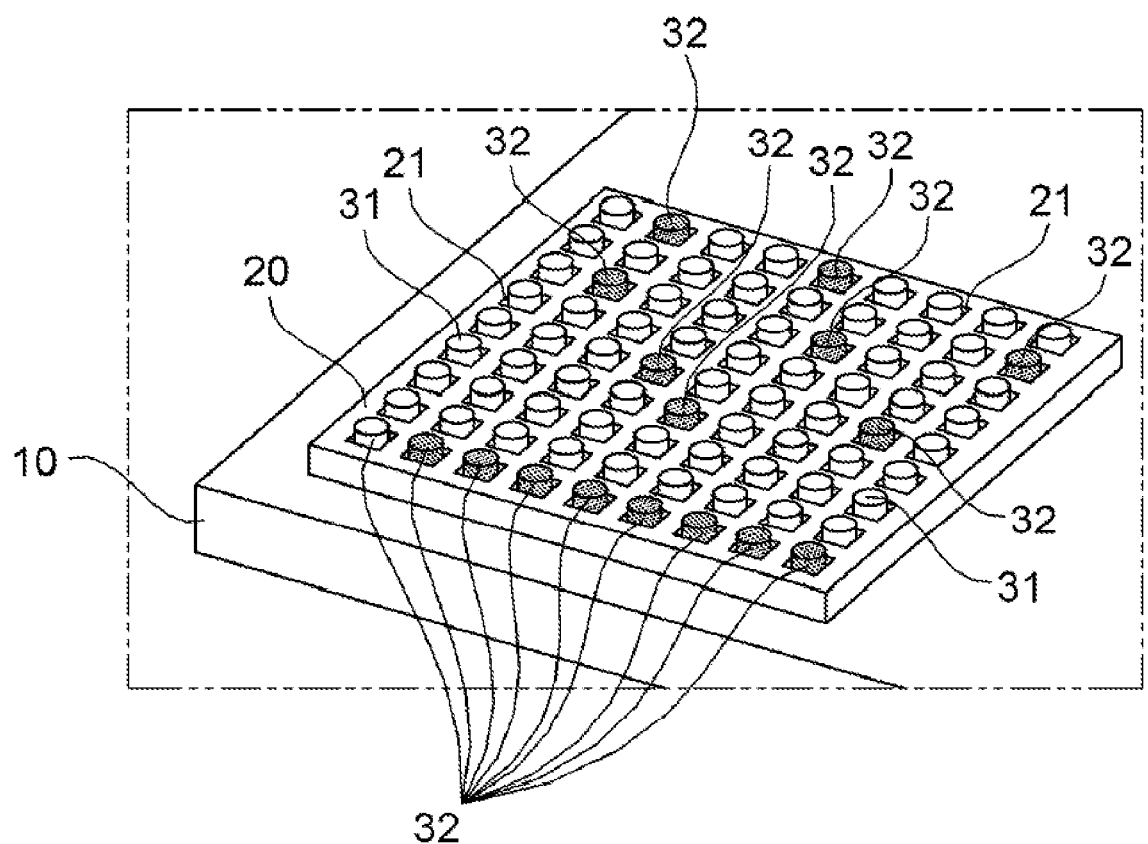

As illustrated in FIG. 5, the non-conductive insertion pins 31 and the conductive insertion pins 32 are inserted into the coupling holes 21 of the security module frame 20 while corresponding to the circuit 11 provided on the printed circuit board 10. In this case, the non-conductive insertion pins 31 and the conductive insertion pins 32 are coupled to form an encrypted pattern.

Figure 6:
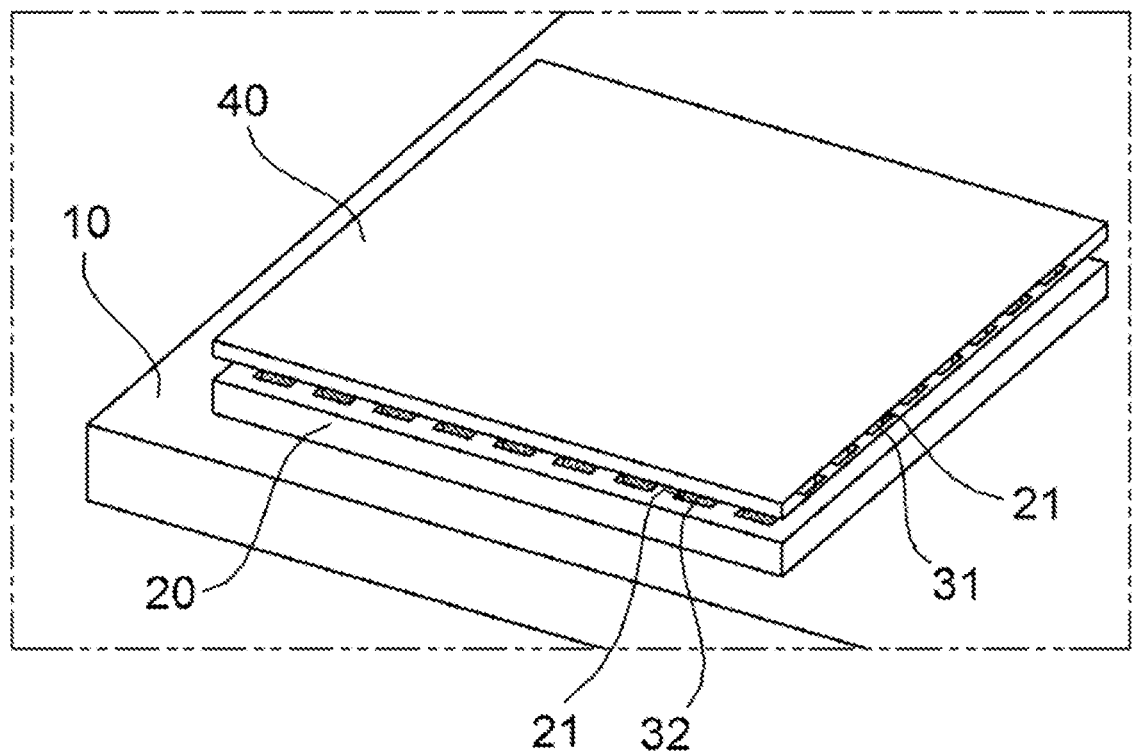

As illustrated in FIG. 6, the security module cover 40 is coupled onto the non-conductive insertion pins 31 and the conductive insertion pins 32 with the non-conductive insertion pins 31 and the conductive insertion pins 32 being inserted into the coupling holes 21 of the security module frame 20. A conductive bottom surface 41 of the security module cover 40 is in contact with the conductive insertion pins 32. The circuit may be configured with the printed circuit board 10 by the conductive bottom surface 41 of the security module cover 40 which is in contact with the upper portions of the conductive insertion pins 32. The security module cover 40 presses the upper portions of the non-conductive insertion pins 31 and the upper portions of the conductive insertion pins 32.

Figure 7:
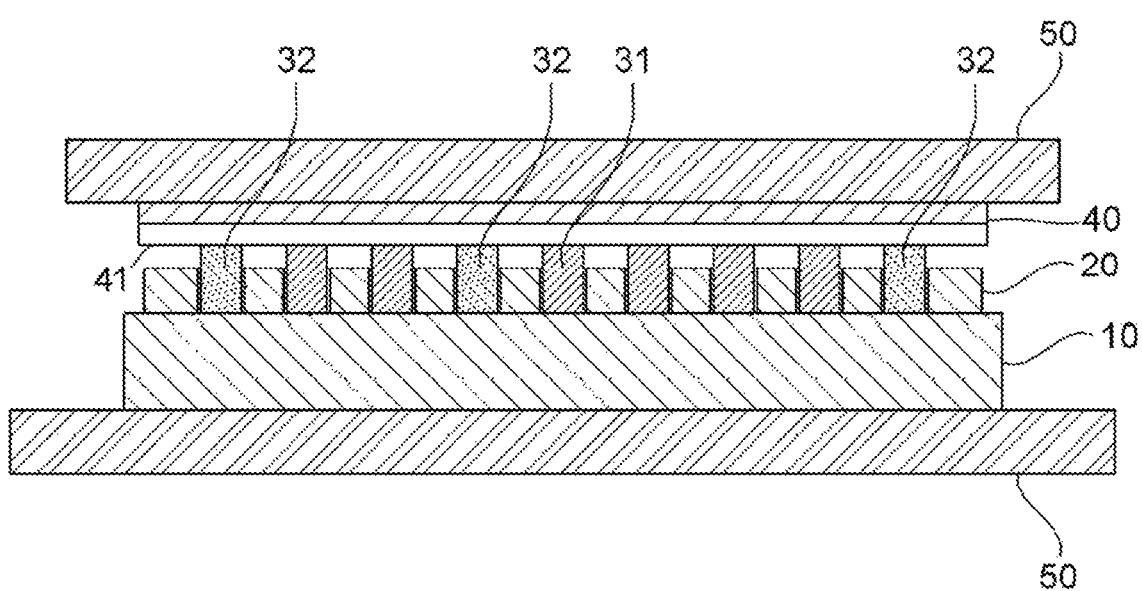

As illustrated in FIG. 7, the housing 50 is coupled to surround the printed circuit board 10 and the security module cover 40.

Next, an operation of the modification prevention device at the time of disassembling the vehicle controller according to one form of the present disclosure will be described.

Figure 8:
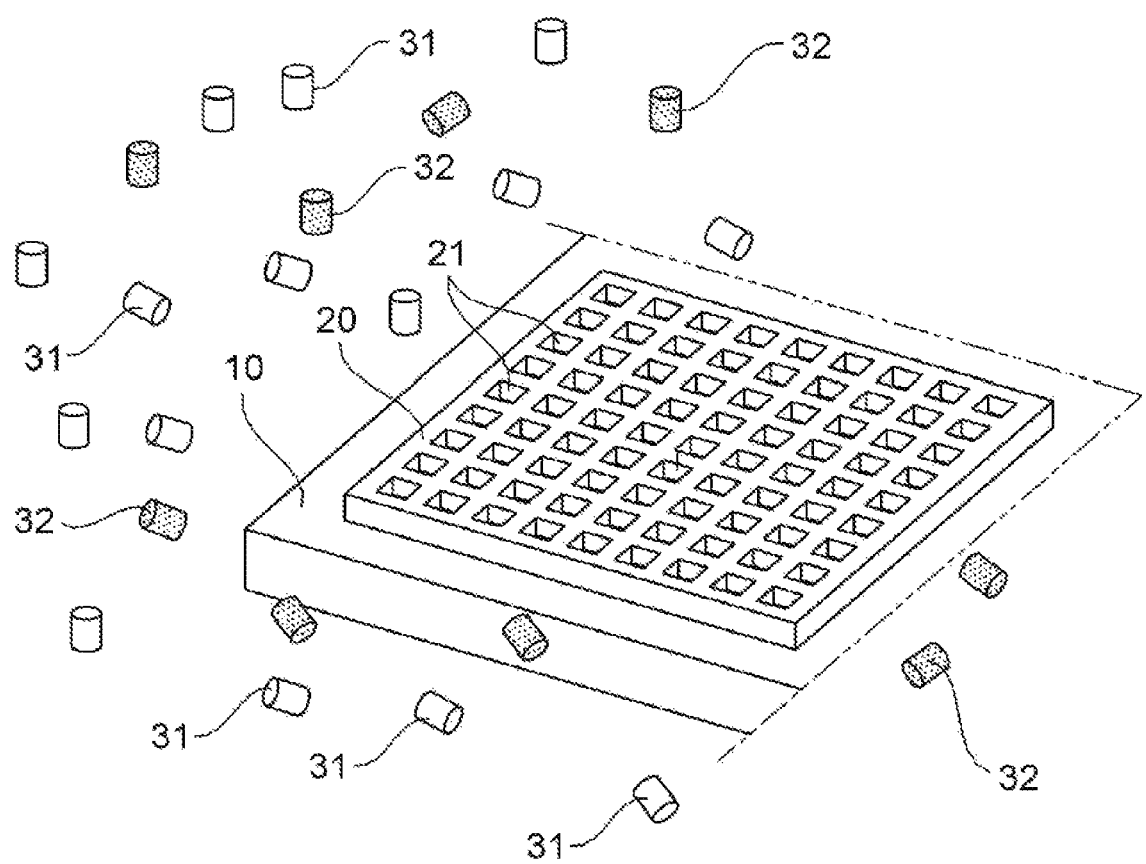
FIG. 8 is a view illustrating a state in which security modules are scattered when the vehicle controller having the modification prevention device is disassembled.

FIG. 8 is a view illustrating a state in which security modules are scattered when the vehicle controller having the modification prevention device according to the exemplary embodiment of the present disclosure is disassembled.

At the same time when the vehicle controller according to one form of the present disclosure is disassembled, all of the non-conductive insertion pins 31 and the conductive insertion pins 32 inserted into the coupling holes 21 of the security module frame 20 are scattered while being separated from the coupling holes 21 of the security module frame 20.

Specifically, the non-conductive insertion pins 31 and the conductive insertion pins 32, which are the modification prevention devices, are inserted and assembled into the coupling holes 21 of the security module frame 20 without a separate fixing structure, such that when a force for pressing the printed circuit board 10 and the housing 50 is eliminated, all of the non-conductive insertion pins 31 and the conductive insertion pins 32 inserted into the coupling holes 21 of the security module frame 20 are scattered while being separated from the coupling holes 21. That is, when the vehicle controller is disassembled so that the security module frame 20 for pressing the upper portions of the non-conductive insertion pins 31 and the upper portions of the conductive insertion pins 32 is disassembled, all of the non-conductive insertion pins 31 and the conductive insertion pins 32, which are inserted, in an encrypted pattern, into the coupling holes 21 of the security module frame 20, are separated from the coupling holes 21 and scattered so that the encrypted pattern cannot be reproduced.

The non-conductive insertion pins 31 and the conductive insertion pins 32, which are scattered as described above, cannot be distinguished with the naked eye, and the pattern of the non-conductive insertion pins 31 and the conductive insertion pins 32 cannot be restored because the initial pattern of the non-conductive insertion pins 31 and the conductive insertion pins 32 coupled to the coupling holes 21 of the security module frame 20 cannot be recognized. In addition, because the pattern of the non-conductive insertion pins 31 and the conductive insertion pins 32 coupled to the coupling holes 21 cannot be recognized, the disassembled vehicle controller cannot be used even though the disassembled vehicle controller is assembled.

However, because a manufacturer stores the data of the encrypted pattern of the non-conductive insertion pins 31 and the conductive insertion pins 32, the manufacturer may assemble the disassembled vehicle controller to use the vehicle controller. In addition, the manufacturer may disassemble and analyze the vehicle controller and may analyze a defective product and reproduce a breakdown, if desired.

As described above, the vehicle controller according to the present disclosure cannot be restored to the original state once the vehicle controller is disassembled, and as a result, the security may be maintained.

The above description is simply given for illustratively describing the technical spirit of the present disclosure, and those skilled in the art to which the present disclosure pertains will appreciate that various modifications, changes, and substitutions are possible without departing from the essential characteristic of the present disclosure. Accordingly, the exemplary embodiments disclosed in the present disclosure and the accompanying drawings are intended not to limit but to describe the technical spirit of the present disclosure, and the scope of the technical spirit of the present disclosure is not limited by the exemplary embodiments and the accompanying drawings. The protective scope of the present disclosure should be construed based on the following claims, and all the technical spirit within the equivalent scope thereto should be construed as falling within the scope of the present disclosure.

As described above, the exemplary embodiments have been described and illustrated in the drawings and the specification. The exemplary embodiments were chosen and described in order to explain certain principles of the present disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the present disclosure are deemed to be covered by the present disclosure.

What is claimed is:

1. A vehicle controller having a modification prevention device, the vehicle controller comprising:
   a printed circuit board;
   a security module frame seated on the printed circuit board and having a plurality of coupling holes; and
   security modules inserted into coupling holes of the plurality of coupling holes and configured to electrically communicate with a circuit of the printed circuit board, wherein the security modules include non-conductive insertion pins and conductive insertion pins inserted into the coupling holes, and the non-conductive insertion pins and the conductive insertion pins are scattered while being separated from the coupling holes of the security module frame when the vehicle controller is disassembled.

2. The vehicle controller of claim 1, wherein the non-conductive insertion pins and the conductive insertion pins are equal in dimension, shape, and color so that the non-conductive insertion pins and the conductive insertion pins are not distinguishable from each other.

3. The vehicle controller of claim 1, wherein the non-conductive insertion pins and the conductive insertion pins are inserted into the coupling holes of the security module frame, forming an encrypted pattern when inserted.

4. The vehicle controller of claim 1, wherein the non-conductive insertion pins and the conductive insertion pins each have a cylindrical shape.

5. The vehicle controller of claim 1, wherein the non-conductive insertion pins and the conductive insertion pins are inserted into the coupling holes of the security module frame, and then a security module cover is coupled to press upper portions of the non-conductive insertion pins and upper portions of the conductive insertion pins.

6. The vehicle controller of claim 5, wherein a conductive bottom surface of the security module cover is in contact with the conductive insertion pins to constitute the circuit of the printed circuit board.

7. The vehicle controller of claim 5, wherein a housing is coupled to surround the printed circuit board and the security module cover.

8. The vehicle controller of claim 1, wherein one end of the non-conductive insertion pins and one end of the conductive insertion pins each have an elastic portion so that the non-conductive insertion pins and the conductive insertion pins are smoothly separated when the vehicle controller is disassembled.

* * * * *